United States Patent
Meyer et al.

(10) Patent No.: US 10,400,880 B2
(45) Date of Patent: Sep. 3, 2019

(54) PLANETARY TRANSMISSION

(71) Applicant: Flender GmbH, Bocholt (DE)

(72) Inventors: Thomas Meyer, Stolberg (DE); Jan-Dirk Reimers, Aachen (DE)

(73) Assignee: FLENDER GMBH, Bocholt (DE)

( * ) Notice: Subject to any disclaimer, the term of this patent is extended or adjusted under 35 U.S.C. 154(b) by 91 days.

(21) Appl. No.: 15/566,990

(22) PCT Filed: Mar. 4, 2016

(86) PCT No.: PCT/EP2016/054630
§ 371 (c)(1),
(2) Date: Oct. 16, 2017

(87) PCT Pub. No.: WO2016/165873
PCT Pub. Date: Oct. 20, 2016

(65) Prior Publication Data
US 2018/0128365 A1 May 10, 2018

(30) Foreign Application Priority Data
Apr. 17, 2015 (EP) .................................... 15164055

(51) Int. Cl.
*F16H 57/01* (2012.01)
*H04Q 9/00* (2006.01)
(Continued)

(52) U.S. Cl.
CPC ........... *F16H 57/01* (2013.01); *F16H 57/082* (2013.01); *G08C 17/02* (2013.01); *H04Q 9/00* (2013.01);
(Continued)

(58) Field of Classification Search
None
See application file for complete search history.

(56) References Cited

U.S. PATENT DOCUMENTS

| 2003/0093188 A1 | 5/2003 | Morita |
| 2008/0269007 A1* | 10/2008 | Cunliffe ............... F16H 1/2836 |
| | | 475/347 |

(Continued)

FOREIGN PATENT DOCUMENTS

| CN | 1412564 A | 4/2003 |
| CN | 202065133 U | 12/2011 |

(Continued)

OTHER PUBLICATIONS

PCT International Search Report and Written Opinion of International Searching Authority dated May 19, 2016 corresponding to PCT International Application No. PCT/EP2016/054630 filed Mar. 4, 2016.

(Continued)

*Primary Examiner* — Colby M Hansen
(74) *Attorney, Agent, or Firm* — Henry M. Feiereisen LLC

(57) ABSTRACT

A planetary transmission includes a planetary stage and a FOFW system having an interrogation unit, a locally fixed antenna electrically connected to the interrogation unit and arranged within a housing of the planetary stage, and a plurality of FOFW sensors fastened to planet gear pins of the planetary stage such that at least two of the FOFW sensors are fastened to each of the planet gear pins. A plurality of co-rotating antennae are fastened to the planet gear carrier at a number corresponding to a number of the planet gear pins. The co-rotating antennae are each electrically connected to at least one of the FOFW sensors and arranged and configured such as to transfer measurement data detected by the FOFW sensors to the locally fixed antenna.

15 Claims, 3 Drawing Sheets

(51) Int. Cl.
  *G08C 17/02* (2006.01)
  *F16H 57/08* (2006.01)
  *H04Q 9/02* (2006.01)
(52) U.S. Cl.
  CPC ......... *H04Q 9/02* (2013.01); *F16H 2057/012* (2013.01); *H04Q 2209/40* (2013.01)

(56) References Cited

U.S. PATENT DOCUMENTS

| | | |
|---|---|---|
| 2009/0312138 A1 | 12/2009 | Illerhaus et al. |
| 2010/0201118 A1 | 8/2010 | Anton |
| 2013/0012350 A1* | 1/2013 | Ebner .................. B60K 7/0007 475/149 |
| 2013/0305827 A1* | 11/2013 | Kessler .................. G01H 9/004 73/649 |
| 2013/0331222 A1* | 12/2013 | Richards .................. F01D 25/18 475/331 |
| 2014/0046614 A1 | 2/2014 | Pettersson |
| 2014/0182402 A1 | 7/2014 | Bieringer |
| 2014/0349815 A1 | 11/2014 | Dinter |
| 2015/0039248 A1 | 2/2015 | Meis et al. |
| 2015/0142175 A1 | 5/2015 | Reimers et al. |
| 2015/0239076 A1 | 8/2015 | Klein-Hitpass et al. |
| 2015/0244168 A1 | 8/2015 | Reimers et al. |
| 2015/0268109 A1 | 9/2015 | Pietron et al. |
| 2016/0229009 A1 | 8/2016 | Klein-Hitpass et al. |
| 2016/0252426 A1 | 9/2016 | Dinter et al. |
| 2016/0290490 A1* | 10/2016 | Brassitos .................. F16H 57/08 |

FOREIGN PATENT DOCUMENTS

| | | |
|---|---|---|
| CN | 103089931 A | 5/2013 |
| CN | 103782359 A | 5/2014 |
| CN | 104121358 A | 10/2014 |
| DE | 102006033983 A1 | 2/2008 |
| DE | 102010032498 A1 | 2/2011 |
| DE | 102010006334 A1 | 8/2011 |
| DE | 10201006085 A1 | 1/2012 |
| DE | 102011085299 A1 | 5/2013 |
| EP | 1160556 A2 | 12/2001 |
| JP | 2006/138873 A | 6/2006 |
| WO | WO 2007/085259 A1 | 8/2007 |
| WO | WO 2009/003016 A1 | 12/2008 |
| WO | WO 2011/104433 A1 | 9/2011 |
| WO | WO 2013/110113 A2 | 8/2013 |

OTHER PUBLICATIONS

Dinter et al., U.S. Pat. No. 8,591,371, Nov. 26, 2013, 2012/0108380, May 3, 2012.
Klein-Hitpass et al., U.S. Pat. No. 8,621,940, Jan. 7, 2014, 2012/0067138, Mar. 22, 2012.
Dinter et al., U.S. Pat. No. 8,632,437, Jan. 21, 2014, 2013-0088016, Apr. 11, 2013.
Dinter et al., U.S. Pat. No. 8,784,252, Jul. 22, 2014, 2013/0172141, Jul. 4, 2013.
Dinter et al., U.S. Pat. No. 8,591,368, Nov. 26, 2013, 2013-0165288, Jun. 27, 2013.
Klein-Hitpass et al., U.S. Pat. No. 9,267,864, Feb. 23, 2016, 2013-0180319, Jul. 18, 2013.
Barthel et al., U.S. Pat. No. 9,297,454, Mar. 29, 2016, 2013-0133454, May 30, 2013.
Boeing et al., 9,051,922, Jun. 9, 2015, 2014-0302957, Oct. 9, 2014.
"Radio sensors systems and identification with SAW sensors" L. Reindl, Clausthal, G. Scholl, F. Schmidt—Munich, Germany, 2000.
"Passive radio-interrogatable torque sensor realized with SAW components" R. Bader—Osterfildern, Germany, 2002.
Nienhaus K et al: "i-MaSS: Ansatz zur Körperschallmessung auf rotlerenden Bauteilen in Getrieben von Windenergieanlagen", VDI-Berichte Nr. 2200, pp. 237-243; D13; 2013.

* cited by examiner

PLANETARY TRANSMISSION

CROSS-REFERENCES TO RELATED APPLICATIONS

This application is the U.S. National Stage of International Application No. PCT/EP2016/054630, filed Mar. 4, 2016, which designated the United States and has been published as International Publication No. WO 2016/165873 A1 and which claims the priority of European Patent Application, Serial No. 15164055.4, filed Apr. 17, 2015, pursuant to 35 U.S.C. 119(a)-(d).

BACKGROUND OF THE INVENTION

The present invention relates to a planetary transmission having a housing and at least one planetary stage which comprises at least one sun gear which is provided on a sun gear shaft that is rotatably mounted on the housing, at least one planet gear carrier that is rotatably mounted on the housing, at least two planet gear pins which are fastened to the planet gear carrier and on each of which a planet gear is rotatably held, and at least one ring gear fastened non-rotationally within the housing and having an internal toothing and with which the planet gears are in engagement.

Planetary transmissions of this type are known in a variety of designs from the prior art. For the identification of damage to such planetary transmissions, normally condition monitoring systems are used which gather operational data using a wide variety of sensors and enable both a condition diagnosis and also in a broader context, enable an assessment of the remaining service life of components or component groups. The operational data gathered can be, for example, temperatures of the bearings, the oil in the supply and return conduits and of the oil in the transmission sump, oscillation values of components in different spatial axes, acoustic emissions in the kilohertz range, particle sizes and/or particle size distributions in oil streams, rotary speeds of individual components, deformations and/or displacements of components, torques and/or forces acting on components, rotary oscillations or the like, to name only a few examples. The measurement variables acquired by the sensors are normally gathered in a data acquisition computer, whereupon an evaluation takes place either against a trend monitoring of the moving average or against pre-set reference values.

A fundamental problem in condition monitoring of planetary transmissions lies in gathering operational data primarily using locally fixed sensors without difficulty and at low cost. However, a measuring technology-based application of sensors on rotating machine parts is very cost-intensive. For this purpose, expensive radio transmitting systems are required which must transfer both the data and also the energy for the sensors, for which purpose in many cases, dedicated amplifiers or signal pre-processing systems must be arranged on the rotating component. Furthermore, the damage to be identified is influenced by a plurality of factors, so that the number of sensors provided on the rotating component is correspondingly large in order to be able to acquire the different operational data. Against this background, applications of measuring technology on rotating machine parts are currently avoided where possible.

SUMMARY OF THE INVENTION

Proceeding from this prior art, it is an object of the present invention to provide an alternative planetary transmission of the aforementioned type which enables a simple and cost-effective acquisition of operational data.

In order to achieve this object, the present invention provides a planetary transmission of the aforementioned type which is characterized in that an FOFW (wirelessly interrogatable surface wave sensor) system is provided which comprises an interrogation unit, at least one locally fixed antenna electrically connected to the interrogation unit and arranged within the housing, at least two FOFW sensors fastened to the planet gear pins and at least a number of co-rotating antennae fastened to the planet gear carrier corresponding to the number of planet gear pins, said antennae each being electrically connected to at least one of the FOFW sensors and arranged and configured such that they transfer measurement data acquired by the FOFW sensors to the at least one locally fixed antenna. A substantial advantage associated with the inventive use of an FOFW system lies therein that FOFW sensors need no separate energy source, so that they can be arranged on the planet gear pins held on the rotating planet gear carrier without additional components, the pins having little installation space available. Furthermore, they have a very simple structure, so that they are normally economical and maintenance-free. In addition, they withstand high thermal and electromagnetic loads, so that they are usable in heavily loaded planetary transmissions without problems. In addition, both the FOFW sensors and the antennae are usually retrofittable without great difficulty so that the inventive FOFW system can be implemented retroactively with already existing planetary transmissions. A further advantage associated with the use of FOFW sensors lies therein that with an FOFW sensor, a plurality of operational data can be acquired simultaneously, so that an arrangement of different sensors can be dispensed with. Overall, thanks to the inventive FOFW system, a simple and economic acquisition of the relevant planet gear operational data is enabled.

According to one embodiment of the present invention, the FOFW system is configured and the FOFW sensors are arranged on the associated planet gear pins such that during the intended operation of the planetary transmission, at least one force component acting upon the associated planet gear pin and/or a stretching of the planet gear pin caused in the region of the FOFW sensor and/or a temperature prevailing in the region of the FOFW sensor and/or a bending of the planet gear pin in the region of the FOFW sensor and/or a rotary speed of the planet gear carrier is/are detected. Thus, for example, forces and moments acting upon the planet gears can be determined dependent upon temperature and/or rotary speed.

Preferably, the FOFW sensors are positioned within a recess provided on the planet gear pin and are covered by a bearing which is provided on the planet gear pin and which receives the planet gear. In such an arrangement, the FOFW sensors are protected against external influences. Furthermore, with the FOFW sensors, not only the operational data relating to the planet gear pins, but also the operational data relating to the bearings can be acquired, such as the temperature of the bearings, which is a substantial indicator of the operational and wear behavior of a bearing.

Advantageously, fastened along the longitudinal extent of each planet gear pin is a plurality of FOFW sensors which are electrically connected to a jointly co-rotating antenna. Thereby, deformations or inclinations of the planet gear pin can be detected which have a significant influence on the load bearing performance of a planet gear stage.

According to one embodiment of the present invention, the signals emitted by the individual FOFW sensors each have a unique frequency signature, in order to differentiate the signals acquired by the individual sensors from one another. Such a frequency signature can be typical of the FOFW sensors. However, it can also be implemented subsequently. Normally, a frequency difference of only a few Megahertz is sufficient in order to be able to differentiate the operational data transferred by the individual FOFW sensors from one another.

According to a first variant of the present invention, the at least one locally fixed antenna is configured and arranged such that the co-rotating antennae are moved sequentially in and out of the receiving range of the at least one locally fixed antenna during a rotation movement of the planet gear carrier. This leads thereto that the operational data acquired by the FOFW sensors provided on the respective planet gear pins is transferred sequentially and therefore related to the corresponding planet gear pins via the associated co-rotating antenna to the locally fixed antenna. The rotary speed of the planet gear carrier can also be determined by means of the temporal interval that lies between successive data transfers, without the need for an additional sensor.

Advantageously, the transmitting and receiving range of the locally fixed and co-rotating antennae is less than the shortest spacing between the co-rotating antennae. In this way, it is ensured that FOFW sensors which are arranged on different planet gear pins cannot simultaneously transfer the data gathered by them, so that the pin-related sequential data transfer is ensured.

According to an alternative variant of the present invention, the at least one locally fixed antenna extends in substantially an annular form at a constant defined spacing from the co-rotating antennae. In this variant, the operational data acquired by the FOFW sensors is not transferred sequentially but continuously.

Advantageously, an evaluation unit linked by means of data technology to the interrogation unit is provided and is arranged such that it carries out calculations on the basis of the data that has been acquired by the co-rotating FOFW sensors and transferred to the interrogation unit, the results of said calculations representing a remaining service life of the planet gear pins and/or of the planet gears and/or of the planet gear carrier when these are set against a statistically assured design dataset. Thus, for example, temperature-compensated RFC (rain flow count) and/or LDD (load duration distribution) datasets of the toothing of the planet gears and/or of the bearings can be created, to name just one example.

The evaluation unit is advantageously configured such that on the basis of the results, maintenance time points are determined. In this way, maintenance according to need can be achieved. In particular, an LDD temperature-compensated using the Arrhenius equation can be used for maintenance interval planning of oil changes.

Advantageously, the FOFW system has further FOFW sensors with associated co-rotating antennae and locally fixed antennae, wherein the further FOFW sensors are arranged in the region of bearings of the planet gear carrier and/or the sun gear shaft. In other words, the FOFW system is configured to acquire operational data of further components of the planetary transmission.

According to one embodiment of the present invention, at least one FOFW sensor is provided as a torque-sensing reference sensor which is arranged, in particular, on the sun gear shaft. Herewith, a load distribution between the planet gears can be determined not only differentially, but also absolutely against the reference sensor, which enables an assessment regarding the reserve capacity of the transmission. Furthermore, temporal changes in the load bearing performance in the sense of transient effects within the transmission stages are also detectable.

In order to achieve the aforementioned object, the present invention further proposes using an FOFW system, in particular an inventive FOFW system and an evaluation unit for determining a remaining service life of planet gear pins and/or planet gears and/or a planet gear carrier of a planetary transmission.

BRIEF DESCRIPTION OF THE DRAWING

Further features and advantages of the present invention will now be described in detail by reference to embodiments of an inventive planetary transmission, taking account of the accompanying drawings.

In the drawings.

DETAILED DESCRIPTION OF PREFERRED EMBODIMENTS

Figure 1:
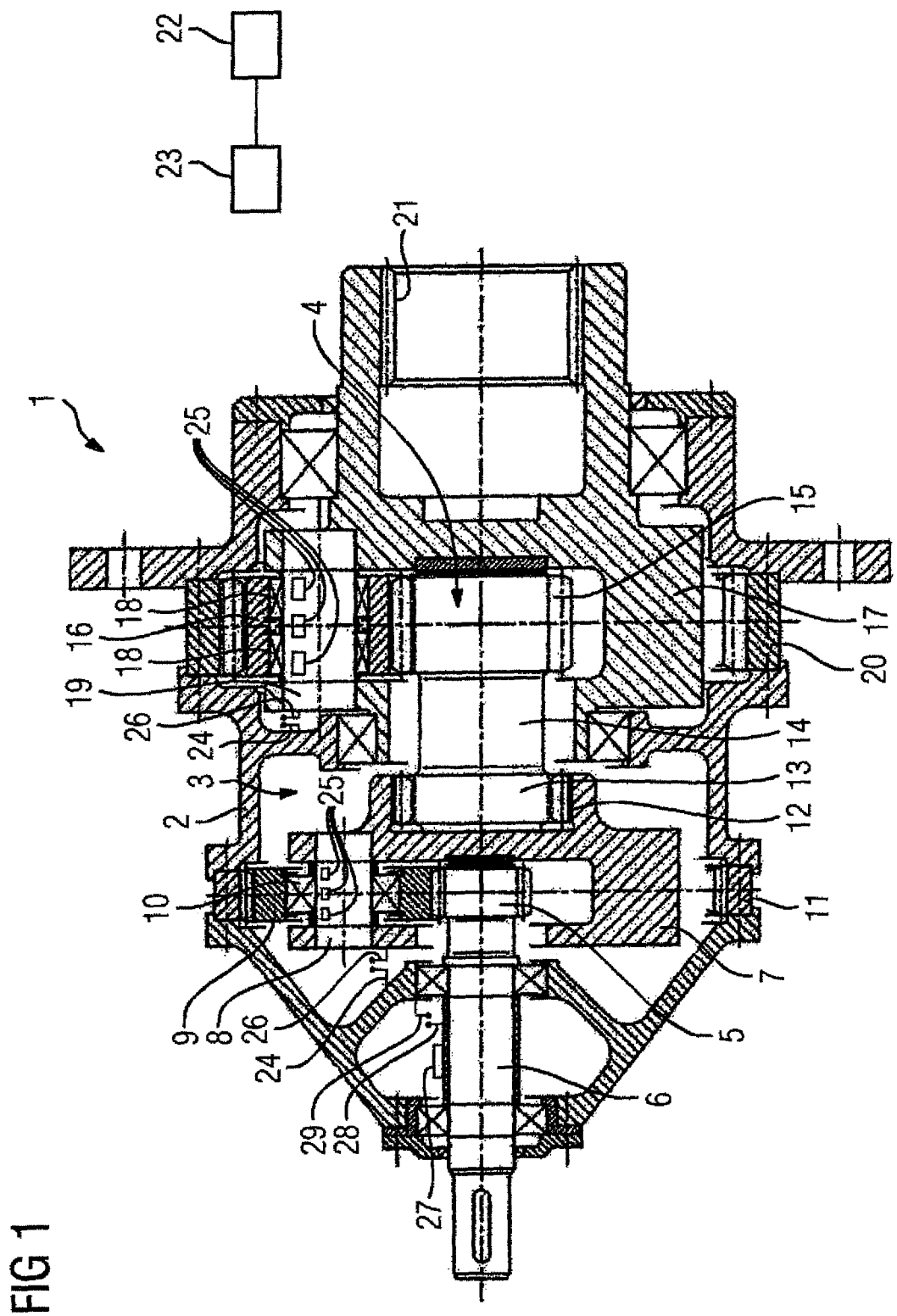
FIG. 1 shows a schematic sectional view of a planetary transmission according to a first embodiment of the present invention, which is provided with an FOFW system.

FIG. 1 shows a planetary transmission 1 according to an embodiment of the present invention. The planetary transmission 1 has a housing 2 in which a first planetary stage 3 and a second planetary stage 4 are arranged. The first planetary stage 3 comprises a sun gear 5 which is provided on a sun gear shaft 6 that is rotatably mounted on the housing 2, a planet gear carrier 7 that is rotatably mounted on the housing 2, with three planet gear pins 8 fastened to said planet gear carrier on each of which a planet gear 9 is rotatably held by means of a bearing 10, and a ring gear 11 fastened non-rotationally within the housing 2 and having an internal toothing, the sun gear 5 engaging with the planet gears 9, which in turn are in engagement with the ring gear 11. The planet gear carrier 7 is provided with an internal toothing 12 with which a first cylindrical gear 13 meshes that is provided on a second sun gear shaft 14 of the second planetary stage 4, said sun gear shaft being rotatably arranged within the housing 2. Also arranged on the second sun gear shaft 14 is a second sun gear 15 which is in engagement with planet gears 16 of a second planet gear carrier 17 which are rotatably held by means of bearings 18 on associated planet gear pins 19. The planet gears 16 mesh with a second ring gear 20 which is fastened non-rotationally within the housing 2 and has an internal toothing. A free end of the second planet gear carrier 17 is guided out of the housing 2 and is provided with an internal toothing 21 by means of which the rotary movement of the second planet gear carrier 17 can be transferred to an external component (not shown in detail).

Figure 2:
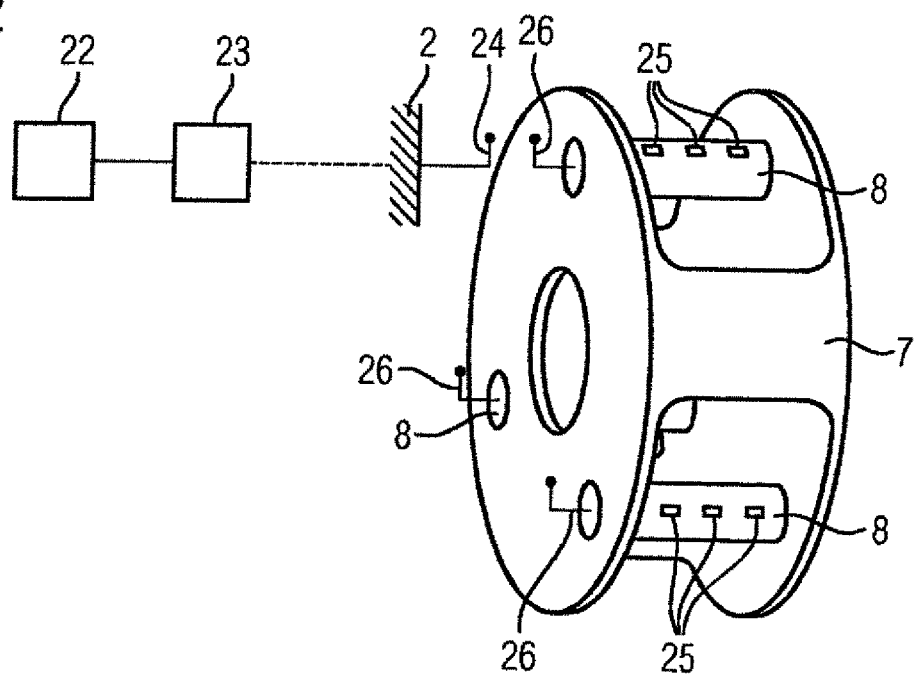
FIG. 2 shows a simplified perspective representation of a planet gear carrier of a first planetary stage of the planetary transmission shown in FIG. 1, said planet gear carrier being provided with components of the FOFW system.

The planetary transmission 1 is equipped with an FOFW system which comprises an evaluation unit 22 and an interrogation unit 23 linked by means of data technology to the evaluation unit 22. A first locally fixed antenna 24, which is arranged within the housing 2 adjacent to the first planet gear carrier 7 is connected to the interrogation unit 23. The planet gear pins 8 of the first planet gear carrier 7 are each provided with three FOFW sensors 25 which are positioned in a row axially in recesses provided at the exterior periphery of the planet gear pins 8 beneath the corresponding bearings 10 and are covered by the bearings. The three FOFW sensors 25 associated with a planet gear pin 8 are each connected to a common co-rotating antenna 26 which is arranged at a defined axial spacing from the locally fixed antenna 24, as shown schematically in FIG. 2. The FOFW sensors 25 each have their own unique frequency signature and are configured such that they detect stretching of the associated planet gear pin 8 and the temperature in the region of the bearings 10 receiving the planet gears 9. Similarly to the planet gear pins 8 of the first planet gear carrier 7, the planet gear pins 19 of the second planet gear carrier 17 are also provided with FOFW sensors 25 which communicate via co-rotating antennae 26 by means of data technology with a locally fixed antenna 24 which is connected to the interrogation unit 23. Furthermore, the FOFW system comprises a reference sensor 27 also configured as an FOFW sensor which is arranged on the sun gear shaft 6 and is connected to a co-rotating antenna 28 that is held on the sun gear shaft 6 and communicates with a further locally fixed antenna 29 that is connected to the interrogation unit 23, wherein the reference sensor 27 detects a torque which acts on the sun gear shaft 6 and serves as a reference.

Figure 3:
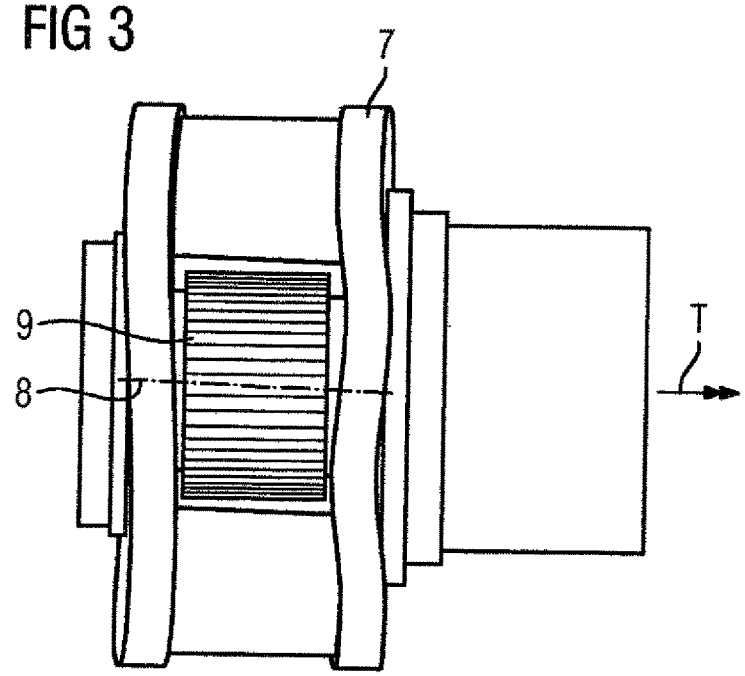
FIG. 3 shows a schematic view of the planet gear carrier shown in FIG. 2, which shows a deformation of the planet gear carrier and of one of the planet gears held on it, during the operation of the planetary transmission.
Figure 4:
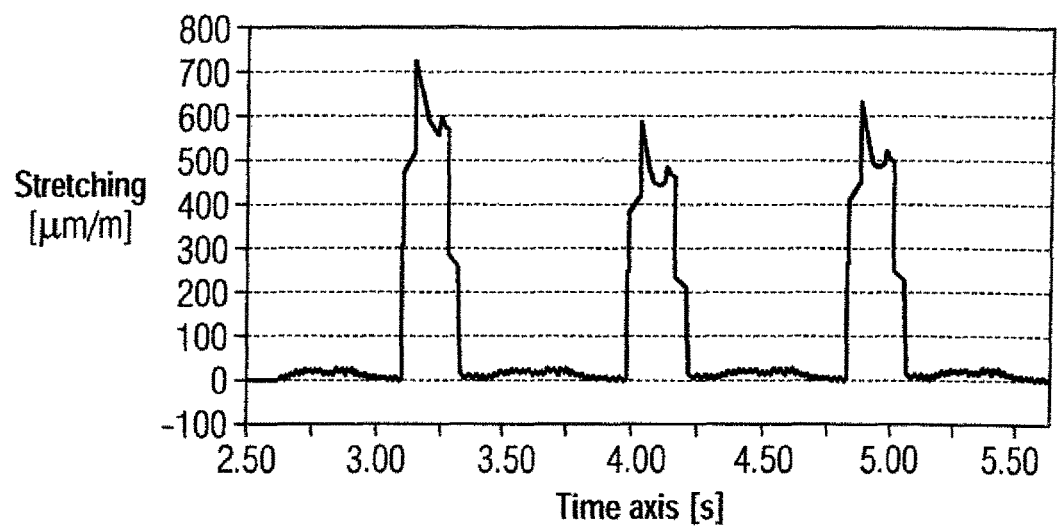
FIG. 4 shows a graphical representation showing the stretching of planet gear pins on which the planet gears are rotatably held, detected by the FOFW system during a single rotation of the planet gear carrier.

During operation of the planetary transmission 1, the co-rotating antennae 26, 28 are each guided past the associated locally fixed antenna 24, 29 once on each rotation. During a pass-by, the FOFW sensors 25, 27 come into the transmitting/receiving range of the locally fixed antenna 24, 29 associated with them and are interrogated, whereupon they detect their measurement values and transfer them to the evaluation unit 22. The FOFW sensors 25 arranged on the planet gear pins 8, 19 each detect measurement values which represent the deformations of the individual planet gear pins 8, 19, as shown in FIGS. 3 and 4. FIG. 3 shows the deformation of an individual planet gear pin 8 under load. FIG. 4 shows the detected deformations of the three planet gear pins 8 after a rotation of the first planet gear carrier 7. Furthermore, the FOFW sensors 25 supply measurement values which represent the current temperature in the region of the bearings 10, 18. Furthermore, on the basis of the temporal spacings and the sequence in which the FOFW sensors 25 of successive planet gear pins 8, 19 transfer their measurement values, in the evaluation unit 22, the current rotary speed and the current rotation direction of the planet gear carriers 7, 17 are calculated. On the basis of these values, in this way, in the evaluation unit 22, the creation of rotary speed-dependent and temperature-compensated RFC and, in particular, LDD datasets of bearings and toothings are enabled. Furthermore, a target-actual comparison of the datasets (RFC, LDD, stress cycle limits, temperature loading) used for the service life design of the components can be used for planning service life times or for damage prediction.

Figure 5:
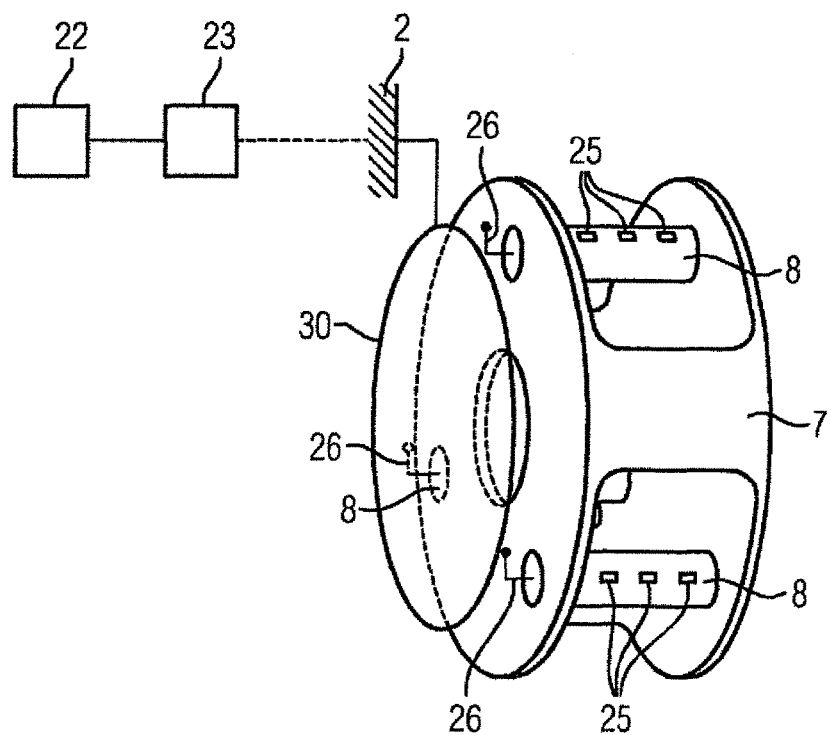
FIG. 5 shows a simplified perspective view of the planet gear carrier of FIG. 2 according to an alternative embodiment of the present invention.

FIG. 5 shows, by way of example, an alternative annular configuration of a locally fixed antenna 30. With this variant, the individual FOFW sensors 25 can be continually interrogated, since they are always in the transmitting/receiving range of the locally fixed antenna 30.

Although the invention has been illustrated and described in detail with the preferred exemplary embodiment, the invention is not restricted by the examples given and other variations can be derived therefrom by a person skilled in the art without departing from the protective scope of the invention. Thus, the number of FOFW sensors arranged on a single planet gear pin, the number of locally fixed and/or co-rotating antennae or the like can be varied, to give only a few examples.

What is claimed is:

1. A planetary transmission, comprising:
    a housing;
    a planetary stage including a sun gear shaft rotatably mounted on the housing, a sun gear operably connected to the sun gear shaft, a planet gear carrier rotatably mounted on the housing, at least two planet gear pins fastened to the planet gear carrier, planet gears rotatably held on the planet gear pins, respectively, and a ring gear fastened non-rotationally within the housing and having an internal toothing, said ring gear being in engagement with the planet gears; and
    a FOFW system including an interrogation unit, a locally fixed antenna electrically connected to the interrogation unit and arranged within the housing, a plurality of FOFW sensors fastened to the planet gear pins such that at least two of the FOFW sensors are fastened to each of the planet gear pins, and a plurality of co-rotating antennae fastened to the planet gear carrier at a number corresponding to a number of the planet gear pins, said co-rotating antennae each being electrically connected to at least one of the FOFW sensors and arranged and configured such as to transfer measurement data detected by the FOFW sensors to the locally fixed antenna.

2. The planetary transmission of claim 1, wherein the measurement data detected by the FOFW sensors during intended operation of the planetary transmission include a force component acting upon the planet gear pins and/or a stretching of the planet gear pins caused in the region of the FOFW sensors and/or a temperature prevailing in a region of the FOFW sensors and/or a bending of the planet gear pins in a region of the FOFW sensors and/or a rotary speed of the planet gear carrier.

3. The planetary transmission of claim 1, wherein the at least two FOFW sensors are positioned within a recess on the associated one of the planet gear pins, and further comprising a bearing provided on the associated one of the planet gear pins and sized to cover the at least two FOFW sensors, said bearing supporting the associated one of the planet gears.

4. The planetary transmission of claim 1, wherein the plurality of FOFW sensors are fastened along a longitudinal extent of the planet gear pins such that more than two of the FOFW sensors are fastened to each of the planet gear pins.

5. The planetary transmission of claim 4, wherein the more than two of the FOFW sensors are jointly connected to the associated one of the co-rotating antennae.

6. The planetary transmission of claim 1, wherein a signal emitted by each of the FOFW sensors has a unique frequency signature.

7. The planetary transmission of claim 1, wherein the locally fixed antenna is configured and arranged such that the co-rotating antennae are moved sequentially in and out of a receiving range of the locally fixed antenna during a rotation movement of the planet gear carrier.

8. The planetary transmission of claim 7, wherein a transmitting range and the receiving range of the locally fixed antenna and the co-rotating antennae are less than a shortest spacing between the co-rotating antennae.

9. The planetary transmission of the claim 8, wherein the FOFW system includes a further locally fixed antenna which extends in substantially annular form at a constant defined spacing from the co-rotating antennae.

10. The planetary transmission of claim 1, wherein the FOFW system includes an evaluation unit which is linked by data connection to the interrogation unit and which carries out calculations on the basis of the measurement data detected by the FOFW sensors and transferred to the interrogation unit to indicate a remaining service life of the planet gear pins and/or of the planet gears and/or of the planet gear carrier.

11. The planetary transmission of claim 10, wherein the evaluation unit is configured to determine maintenance time points on the basis of the calculations.

12. The planetary transmission of claim 1, wherein the FOFW system has further FOFW sensors with associated co-rotating antennae and locally fixed antennae, said further FOFW sensors being arranged in a region of bearings of the planet gear carrier and/or the sun gear shaft.

13. The planetary transmission of claim 1, wherein at least one of the at least two FOFW sensors is a torque-sensing reference sensor.

14. The planetary transmission of claim 13, wherein the torque-sensing sensor is arranged on the sun gear shaft.

15. A FOFW system, comprising:
an interrogation unit;
a locally fixed antenna electrically connected to the interrogation unit;
a FOFW sensor configured to detect measurement data;
a rotating antenna electrically connected to FOFW sensor for transfer of the measurement data to the interrogation unit via the locally fixed antenna and the rotating antenna, and
an evaluation unit linked by data connection to the interrogation unit and configured to carry out calculations on the basis of the measurement data detected by the FOFW sensors to indicate a remaining service life of planet gear pins and/or of the planet gears and/or of a planet gear carrier of a planetary transmission.

* * * * *